United States Patent
Bottero et al.

(10) Patent No.: US 11,427,342 B2
(45) Date of Patent: Aug. 30, 2022

(54) AIR INLET FOR A NACELLE FOR AN AIRCRAFT AND ITS PROCESS FOR MANUFACTURING

(71) Applicant: LEONARDO S.P.A., Rome (IT)

(72) Inventors: Luca Bottero, Olgiate Olona (IT); Massimo Gregori, Fagnano Olona (IT); Alberto Midali, Sesto Calende (IT)

(73) Assignee: LEONARDO S.P.A., Rome (IT)

( * ) Notice: Subject to any disclaimer, the term of this patent is extended or adjusted under 35 U.S.C. 154(b) by 233 days.

(21) Appl. No.: 16/011,305

(22) Filed: Jun. 18, 2018

(65) Prior Publication Data
US 2018/0362178 A1      Dec. 20, 2018

(30) Foreign Application Priority Data
Jun. 19, 2017    (IT) .......................... 102017000067602

(51) Int. Cl.
    B64D 33/02    (2006.01)
    F02C 7/047    (2006.01)
    B64D 15/12    (2006.01)
    F02C 7/045    (2006.01)
    B64F 5/10     (2017.01)

(52) U.S. Cl.
    CPC ............. *B64D 33/02* (2013.01); *B64D 15/12* (2013.01); *B64F 5/10* (2017.01); *F02C 7/045* (2013.01); *F02C 7/047* (2013.01); *B64D 2033/0206* (2013.01); *B64D 2033/0233* (2013.01); *F05D 2260/96* (2013.01)

(58) Field of Classification Search
    CPC .................... B64D 33/02; B64D 15/12; B64D 2033/0206; B64D 2033/0233; B64F 5/10; F02C 7/045; F02C 7/047; F05D 2260/96
    See application file for complete search history.

(56) References Cited

U.S. PATENT DOCUMENTS

| | | | | |
|---|---|---|---|---|
| 5,702,231 A | * | 12/1997 | Dougherty ............. | B64D 33/02 415/119 |
| 8,197,191 B2 | * | 6/2012 | Binks ..................... | B64D 33/02 415/119 |
| 8,240,982 B2 | * | 8/2012 | Vauchel ................. | B64D 15/12 415/119 |
| 8,733,688 B2 | * | 5/2014 | Gantie .................. | B64D 15/163 244/1 N |
| 8,794,572 B2 | * | 8/2014 | Porte ..................... | B64D 33/02 244/1 N |

(Continued)

FOREIGN PATENT DOCUMENTS

EP        2017077 A2 *  1/2009  ............. F02C 7/045

OTHER PUBLICATIONS

Italian Search Report from Italian Patent Application No. 2017000067602, dated Jan. 31, 2018.

*Primary Examiner* — Jeremy A Luks
(74) *Attorney, Agent, or Firm* — Merchant & Gould P.C.

(57) ABSTRACT

An air inlet (3) for a nacelle (2) for an aircraft (1) includes at least one acoustic panel (5), adapted to lower noise generated by the engine (21) to which the air inlet (3) is connected. At least one lip (6) defines the profile upon which an airflow flowing into the air inlet (3) acts. If necessary, at least one engine ring (4) is adapted to allow the air inlet (3) to be connected to an engine (21) of the nacelle (2). If necessary, at least one outer barrel (7) is adapted to define the outer shape of the air inlet (3) upon which an airflow acts. The air inlet (3) is manufactured as one single piece, made of a composite material.

11 Claims, 4 Drawing Sheets

(56) References Cited

U.S. PATENT DOCUMENTS

| | | | | |
|---|---|---|---|---|
| 8,863,893 | B2* | 10/2014 | Sternberger | B64D 33/02 |
| | | | | 181/213 |
| 8,899,512 | B2* | 12/2014 | Vauchel | B64D 33/02 |
| | | | | 244/1 N |
| 9,010,084 | B2* | 4/2015 | Chelin | B64D 15/04 |
| | | | | 137/15.1 |
| 9,708,072 | B2* | 7/2017 | Lumbab | F01D 25/005 |
| 9,938,852 | B2* | 4/2018 | Lumbab | B64D 33/02 |
| 10,294,867 | B2* | 5/2019 | Lumbab | B32B 37/12 |
| 10,532,820 | B2* | 1/2020 | Caruel | B64D 33/02 |
| 2005/0006529 | A1* | 1/2005 | Moe | B64D 15/12 |
| | | | | 244/134 D |
| 2008/0179448 | A1 | 7/2008 | Layland et al. | |
| 2010/0199629 | A1 | 8/2010 | Chene et al. | |
| 2015/0377128 | A1 | 12/2015 | Copiello | |

* cited by examiner

AIR INLET FOR A NACELLE FOR AN AIRCRAFT AND ITS PROCESS FOR MANUFACTURING

This application claims the benefit of Ser. No. 10/201, 7000067602, filed 19 Jun. 2017 in Italy and is incorporated herein by reference. To the extent appropriate, a claim of priority is made to the above-disclosed application.

The invention relates to an air inlet for a nacelle of an engine aircraft.

The air inlet according to the invention is manufactured as one single piece, in particular using composite materials, more in particular with one single stabilization cycle, for example in autoclave, implementing a procedure which is known in the field as co-curing.

As it is known, the air inlet of a nacelle currently consists of the following components: an engine ring, an acoustic panel, which, in turn, commonly comprises two or three pieces, a lip, an outer barrel, which, in turn, commonly comprises two or three pieces, and a plurality of partitions and reinforcements. These components are manufactured individually, even with different materials, such as metal materials and composite materials, and then assembled together and joined to one another.

For example, the engine ring traditionally is a separate element, made of a metal material, and is fixed to the structure of the air inlet through screws and bolts. The acoustic panel, on the other hand, normally consists of two or three properly positioned pieces of composite material or sheet metal pieces glued together and is fixed to the structure of the air inlet through mechanical fixing means, such as screws and bolts.

The operations carried out to assembly the parts of the air inlet, besides increasing manufacturing costs, jeopardize the overall performances of the single elements making up the air inlet of the nacelle, especially in the portions joining the different parts.

It is known, indeed, that the presence of joints between the lip and the outer barrel generates a difference between the airfoil of the air inlet and the theoretical designing airfoil due to manufacturing and assembling tolerances, thus creating discontinuities between the coupled surfaces, such as steps or openings. This difference generates disturbances in the air flow, which is not laminar any longer, hence increasing aerodynamic resistance and jeopardizing the performances of the aircraft.

Therefore, market needs lead manufacturers to produce nacelles that are adapted to reduce energy consumption.

Solutions are known, in which manufacturers tried to integrate some parts of the air inlet so as to reduce the number of elements to be assembled as well as aerodynamic resistance.

These solutions, despite reducing manufacturing and energy consumption costs, are significantly outdone by the performances offered by the solution suggested by this invention.

Furthermore, in the field there is the need to lower the noise generated by the engine assembly. Prior art solutions lack effectiveness on this matter, for their results jeopardize other aspects of the air inlet, such as for example weight and/or aerodynamic performances.

A further technical problem concerns the formation of ice on the portions exposed to the air of the air inlet. Solutions are known, which allow manufacturers to place heating elements in the area of the surfaces subjected to the formation of ice. The adopted solutions are typically based on the bleeding of hot air from the engines and on the following directing thereof towards the area of interest through metal pipes. This solution is affected by some limits concerning the weight of the system, which necessarily needs to be made of metal, the high temperatures involved and the general low efficiency of the system.

The object of the invention is to solve the aforesaid technical problems as well as other problems by providing an air inlet for a nacelle manufactured as one single piece, in particular in one single body.

The features and advantages of the air inlet, of the nacelle and of the process will be best understood upon perusal of the following description of possible non-limiting explanatory embodiments and of the accompanying drawings, which respectively show what follows.

Figure 1:
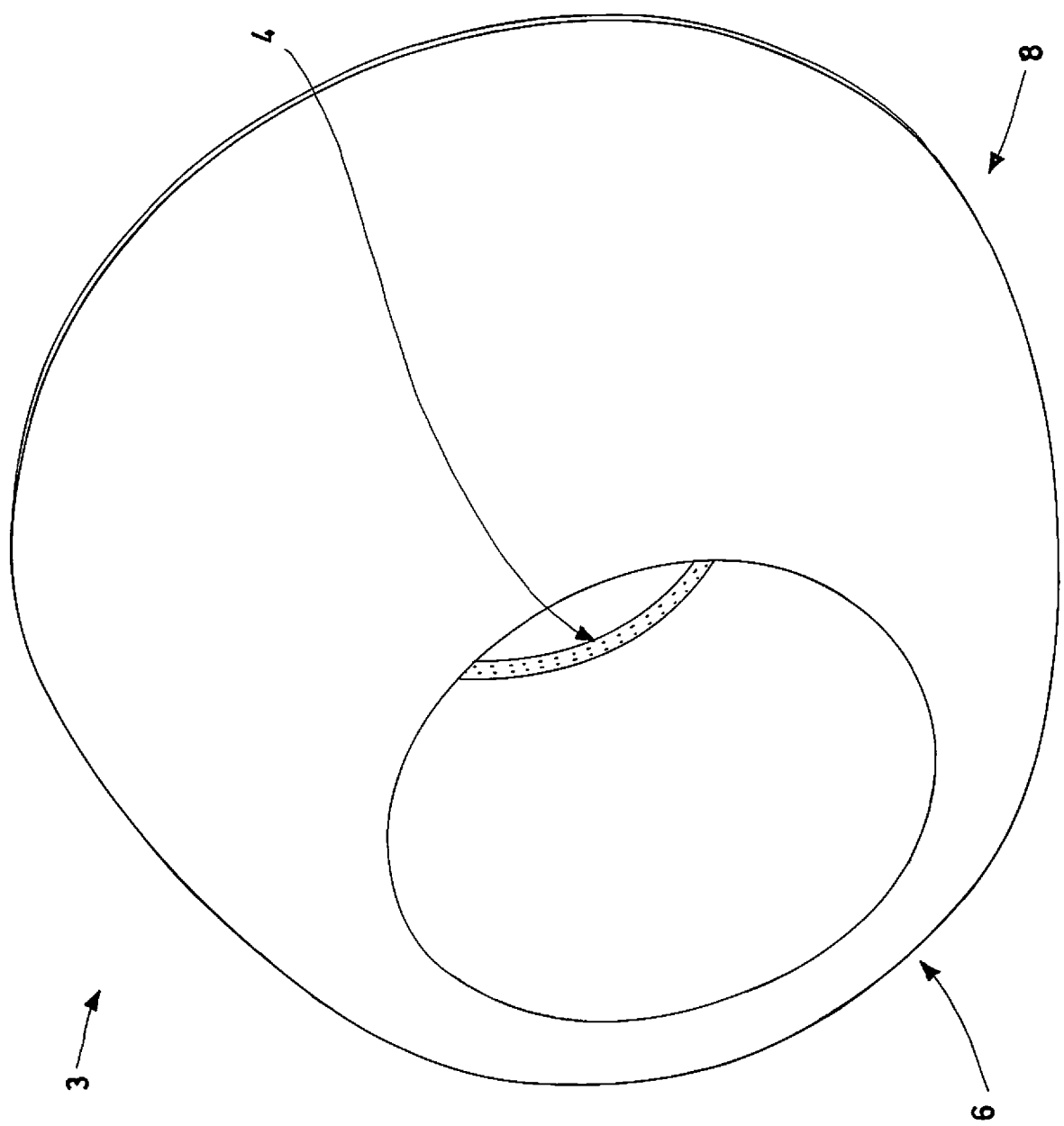
FIG. 1 shows, in an axonometric view, a possible embodiment of the air inlet according to the present invention.

With reference to the aforesaid figures, air inlet 3 according to the invention is particularly adapted to be associated with a nacelle 2 for an aircraft 1.

Air inlet 3 according to the invention comprises: at least one acoustic panel 5, the latter being adapted to lower the noise generated by an engine 21 to which air inlet 3 can be connected; and at least one lip 6 defining the profile upon which an air flow can act, which is flowing into air inlet 3.

Said air inlet 3 according to the invention is manufactured as one single piece, made of a composite material, in one single body.

For the purpose of this description, the term "one single piece" means that in air inlet 3 there are no joints between the parts comprised in the air inlet itself, in particular between the aforesaid parts and/or between the parts described below, thus creating one single body. More in general, there are no joints adapted to fix distinct parts of air inlet 3 to one another, in particular the aforesaid parts and/or the parts described below as comprised in air inlet 3.

Therefore, in this embodiment, at least one acoustic panel 5 and at least one lip 6 of air inlet 3 are manufactured as one single piece, in one single body.

By manufacturing an air inlet 3 as one single piece it is possible to eliminate joints between the parts of air inlet 3. This solution allows manufacturers to obtain a reduction in aerodynamic resistance and, as a consequence, a reduction in the consumption of fuel of engine 21 comprised in nacelle 2 of aircraft 1. Furthermore, it is possible to obtain laminar air flows on the structure, for the greatest part of the extension of the inner duct of air inlet 3.

In a preferred embodiment, said at least one air inlet 3 comprises at least one outer barrel 7, which is adapted to define the outer shape of air inlet 3 upon which an air flow can act.

Said air inlet 3 according to the invention is manufactured as one single piece, made of a composite material.

Therefore, in this embodiment, at least one acoustic panel 5, at least one lip 6 and at least one outer barrel 7 of air inlet 3 are manufactured as one single piece, in one single body.

By manufacturing an air inlet 3 in one single piece, it is possible to obtain laminar air flows on the structure, for the greatest part of the extension of outer barrel 7 and of the inner duct of air inlet 3. Indeed, the invention allows manufacturers to eliminate joints between the parts of air inlet 3. This solution allows manufacturers to obtain a reduction in aerodynamic resistance and, as a consequence, a reduction in the consumption of fuel of engine 21 comprised in nacelle 2 of aircraft 1, since it leads to the creation of a laminar air flow, which extends over a large a part of outer barrel 7 and of the inner duct of air inlet 3, and, consequently, to improved airfoils thanks to the elimination of joints.

In a preferred embodiment, said at least one air inlet 3 comprises at least one engine ring 4, which is adapted to allow air inlet 3 to be connected to an engine 21 of nacelle 2.

Said air inlet 3 according to the invention is manufactured as one single piece, made of a composite material.

Therefore, in this embodiment, at least one acoustic panel 5, at least one lip 6, at least one outer barrel 7 and/or at least one engine ring 4 of air inlet 3 are manufactured as one single piece, in one single body.

In the state of the art, the engine ring generally is a separate element, distinct from the rest of the air inlet and made of metal. In this embodiment, engine ring 4 is entirely manufactured with the rest of the body of air inlet 3, made of a composite material, thus significantly reducing the weight of entire air inlet 3 as well as manufacturing and assembling costs.

In the preferred embodiment, air inlet 3 is manufactured by means of one single stabilization cycle, for example by means of one single autoclave cycle, or one single oven cycle, or one single press cycle, depending on the material used for manufacturing air inlet 3.

By using one single stabilization cycle for manufacturing air inlet 3, besides obtaining the technical effects indicated above, it is possible to significantly reduce the time needed to manufacture an entire air inlet 3, thus remarkably lowering production costs, since, among other things, the labor times needed for air inlet 3 are reduced.

In a preferred, though non-limiting embodiment of air inlet 3 according to the invention, said acoustic panel 5 substantially extends from said engine ring 4 to said lip 6.

In air inlet 3 according to the invention, for it is manufactured as one single piece, it is possible to design a noise lowering device obtained by means of said acoustic panel 5, which can substantially extend along the entire longitudinal extension of air inlet 3.

Generally speaking, air inlet 3 according to the invention allows the noise lowering surface to be increased, up to an increase thereof amounting to 70% or more compared to an air inlet consisting of discrete elements assembled together.

Hence, this solution allows manufacturers to increase the area available for a noise lowering device and, in particular, to crate an acoustic panel 5.

Therefore, this solution allows manufacturers to create a noise lowering device extending up to the area of lip 6.

Acoustic panel 5 comprised in air inlet 3 according to the invention creates a plurality of Helmholtz resonators, which allow noise to the lowered. The operating principle of an acoustic panel using the principle of Helmholtz resonators will not be described any further, as it is known to a person skilled in the art.

The total noise lowering capacity of air inlet 3 is provided by acoustic panel 5 and by the process for manufacturing air inlet 3 itself. Indeed, this process allows manufacturers to produce acoustic devices, in particular acoustic panels 5, with high performances, as explained more in detail below. Acoustic panels 5 comprised in air inlet 3 have an acoustic impedance close to the calculated optimal value, so as to obtain the maximum noise damping possible. The optimal impedance varies based on the incident noise spectrum and on the air flow body in air inlet 3 and, therefore, it depends on the operating rpm of the engine.

Generally speaking, air inlet 3 according to the invention, for its is manufactured as one single piece using a composite material, comprising a front layer $3a$, which defines an outer profile of air inlet 3 and is visible from the outside; a rear layer $3c$, which defines an inner profile of air inlet 3 and it is not visible from the outside; and at least one intermediate layer $3b$, which is incorporated between said two layers ($3a$, $3b$).

Said intermediate layer $3b$ is preferably made with a honeycomb structure.

In the area of air inlet 3 where said intermediate layer $3b$ is located there can be obtained said acoustic panel 5, in particular by making holes in said front layer $3a$, so as to create Helmholtz resonators.

Intermediate layer $3b$ can also be used as stiffening structure for one or more portions of air inlet 3.

Preferably, air inlet 3 according to the invention incorporates, in the structure of the air inlet itself, an anti-icing system 8. Said anti-icing system 8 is electric, for example a heating element, and is manufactured with an anti-freezing technology known as "running wet". This technology prevents water or water vapor from freezing on the surfaces, in particular on the surfaces subjected to an air flow. This anti-icing system 8 is more efficient from an energy consumption point of view, as it requires an electric power consumption compared to other technologies used for manufacturing anti-icing systems, such as for example the "fully evaporative" technology.

In a possible explanatory and non-limiting embodiment, said anti-icing system 8 is a heating element. Said heating element is obtained by means of a redundant electronic circuit.

Anti-icing system 8, for it is electric and incorporated inside the structure of air inlet 3 and as it operates with a "running wet" technology, leads to a reduction in energy consumption and in the typical weight of traditional anti-icing systems.

In a possible explanatory and non-limiting embodiment, said anti-icing system 8 comprises a solid state redundant electronic circuit. The circuit, as it comprises a plurality of connections or branches and redundant nodes, is intrinsically resistant to possible interruptions of a plurality of interconnections between the nodes, thus ensuring the continuity and functionality of the circuit even in the presence of multiple single interruptions of connections or branches of the same circuit, for example caused by holes, for example needed to create Helmholtz resonators. The continuity and functionality of the circuit is ensured for a high percentage, approximately 99.99% of the cases. The electric circuit is redundant because there is a plurality of paths adapted to lead an electric/electronic current between any two nodes. A second possible use of the circuit, besides the one as anti-icing system, is as communication line. Hence, the circuit can be used as electric energy or electric and/or electronic signal leading element, useful to manage and/or control sensors and/or actuators.

In an alternative embodiment, said anti-icing system 8 is obtained by means of a system comprising a plasma actuator, which is suited to be incorporated in the structure of air inlet 3, especially relative to the air-exposed surface. Said plasma actuator is adapted to generate at least one plasma discharge adapted to create a flow of ionized hot air particles towards said air-exposed surface.

Air inlet 3 according to the invention is particularly adapted to be associated with a nacelle 2 for an aircraft 1.

Nacelle 2 comprises an engine 21 and a containing structure 22, which is adapted to surround engine 21.

Air inlet 3 according to the invention allows manufacturers to improve the performances of engine 21 and, in particular, to reduce consumptions. Indeed, air inlet 3 according to the invention reduces the fuel consumption of aircraft 1, thanks to the fact that air inlet 3 ensures a laminar air flow, in particular extending along a great part of outer barrel 7. Air inlet 3 according to the invention has improved aerodynamic efficiencies compared to currently known solutions because there are no more joints between the parts comprised in air inlet 3.

A preferred embodiment of the process for manufacturing an air inlet 3 adapted to be applied to nacelles 2 preferably comprises the following steps, more preferably steps that take place one after the other:

laminating a front layer 3a of air inlet 3;

assembling at least one honeycomb intermediate layer 3b on at least one portion of said front layer 3a;

laminating a rear layer 3c of air inlet 3;

processing air inlet 3 so obtained by means of one single stabilization cycle;

making a plurality of holes in at least one portion of front layer 3a, so as to generate Helmholtz resonators.

The step of laminating a front layer 3a involves shaping the layer of air inlet 3 which will be visible from the outside.

During the step of laminating a front layer 3a, the shape at least of lip 6 and, if necessary, also of outer barrel 7 and of engine ring 4 are defined. The shape will follow the designing specifications of air inlet 3. In the preferred, though non-limiting embodiment, during the step of laminating a front layer 3a, the shape of lip 6, of outer barrel 7 and of engine ring 4 is defined.

Therefore, this step properly involves shaping the front layer 3a, made of a composite material, in order to obtain the desired profile of air inlet 3, at least in the portion that has to be manufactured as one single piece. The visible profile of air inlet 3 is substantially similar to the theoretical designing profile, as there are no joints between the parts.

Said front layer 3a preferably is made of a thermosetting matrix, for example an epoxy or thermoplastic resin matrix, with reinforcement carbon fibers.

In a possible explanatory and non-limiting embodiment, during and/or after the step of laminating a front layer 3a, there is provided a sub-step of laying anti-icing system 8 in the area of the portions of interest of air inlet 3. During this step, for example, a redundant electronic circuit like the one described above is properly positioned.

In a possible embodiment, the shape of front layer 3a and, in particular, the composition and/or the thickness thereof, can vary in the different portions of air inlet 3, depending on the needs.

After the step of laminating a front layer 3a, there is the step of assembling at least one intermediate layer 3b. Preferably, during the step of assembling at least one honeycomb intermediate layer 3b, the extension and the arrangement of acoustic panel 5 are defined.

Said intermediate layer 3b preferably is a honeycomb structure. The shape and the dimensions of each single cell of intermediate layer 3b are intentionally designed so that it can be used as cavity for a Helmholtz resonator.

In a possible embodiment, between the step of laminating front layer 3a and the step of assembling at least one intermediate layer 3b there is a sub-step of laminating an adhesive layer on front layer 3a.

Said intermediate layer 3b is placed on at least one portion of said front layer 3a. In particular, said intermediate layer 3b is arranged at least one all the portions of front layer 3a for which an acoustic panel 5 for air inlet 3 needs to be used. Said intermediate layer 3b can also be used, besides as component for manufacturing an acoustic panel 5, as reinforcement structure for the structure of air inlet 3. In this way, besides ensuring the desired stiffness and self-bearing ability in the proper areas of air inlet 3, there is a significant reduction of the total weight of air inlet 3.

The shape of the cells of intermediate layer 3b can vary depending on the needs and based on the area of air inlet 3 where it has to be placed.

After the step of assembling at least one intermediate layer 3b, there is the step of laminating a rear layer 3c of air inlet 3.

In a possible embodiment, between the step of assembling at least one intermediate layer 3b and the step of laminating a rear layer 3c there is a sub-step of laminating an adhesive layer on intermediate layer 3b. Said adhesive layer, like the one that can be placed between front layer 3a and intermediate layer 3b, is for example a thermosetting resin, for example an epoxy resin, or a thermoplastic resin.

Generally speaking, said step of laminating a rear layer 3c allows manufacturers to properly shape rear layer 3c, made of a composite material, in order to obtain the inner profile of air inlet 3, which is not visible.

Said rear layer 3c preferably is made of a thermosetting matrix, for example an epoxy or thermoplastic resin matrix, with reinforcement carbon fibers.

After the step of laminating a rear layer 3c, both front layer 3a and rear layer 3c have not been processed, for example polymerized or vulcanized, yet and, therefore, the respective matrices are not stabilized yet, for example due to a stabilization cycle, such as an autoclave cycle or an oven cycle or a press cycle.

After the step of laminating a rear layer 3c, there is the step of processing air inlet 3 assembled by so doing.

Hence, the stabilization, for example a polymerization or a vulcanization, only takes place when both front layer 3a and rear layer 3c have been properly laminated.

The step of processing air inlet 3 is carried out by means of one single stabilization cycle, for example by means of an autoclave cycle.

The invention envisages the execution of one single stabilization process, for example polymerization or vulcanization, for example by having the entire air inlet 3 undergo one single autoclave, oven or press cycle. Therefore, air inlet 3 is subjected to a process that can be defined as co-curing.

Therefore, the process according to the invention allows manufacturers to significantly reduce the times of the manufacturing cycles needed to produce air inlet 3.

After the step of processing air inlet 3, there is the step of making a plurality of holes.

This step involves making holes in at least one portion of front layer 3a, so as to generate Helmholtz resonators.

Preferably, said portion of front layer 3a where the aforesaid holes are made is included in the portion of air inlet 3 where said intermediate layer 3b is positioned.

Said plurality of holes are made in said front layer 3a in a mechanical manner, for example using perforation spindles with a single head or with a multiple head.

The size and the distance of the holes depend, among other things, on the dimensions of each cell of intermediate layer 3b, in compliance with the specifications to be followed when manufacturing a Helmholtz resonator. Preferably, the distance between the holes is proportionate to the dimensions of the cells of intermediate layer 3b.

This solution allows manufacturers to obtain acoustic panel 5 with very high acoustic properties compared to an acoustic panel associated with an air inlet consisting of different parts assembled together in a mechanical manner, by means of joints.

Thanks to the fact the step of making a plurality of holes is carried out after the step of polymerizing air inlet 3, resulting acoustic panel 5 is characterized by ensuring that all generated holes are open, in particular are not obstructed by glues and/or resins, which is a typical problem affecting those manufacturing processes in which different polymerization steps are carried out and/or the step of making a plurality of holes takes place after the last polymerization step; therefore, the noise lowering performances of air inlet 3 according to the invention are improved.

Furthermore, since there are no joints in air inlet 3 according to the invention, the area associated with a noise lowering device, represented by acoustic panel 5, is maximized. Indeed, the area where to create said acoustic panel 5 can be increased, for example by extending it up to lip 6, as shown for example in FIG. 2.

Furthermore, even though the area where said acoustic panel 5 is present is increased, the total weight of air inlet 3 significantly decreases.

Air inlet 3 manufactured by means of the process according to the invention allows manufacturers to eliminate both structural discontinuities and acoustic discontinuities, thus improving the performances of air inlet 3.

According to alternative embodiments of the process, in particular in relation to those areas of air inlet 3 where there is acoustic panel 5, intermediate layer 3b comprises a porous partition glued between two honeycomb structures.

FIG. 1 shows, in an axonometric view, air inlet 3 according to the invention. According to the figure, the preferred embodiment of air inlet 3 is free from joints, in particular on front layer 3a of air inlet 3, i.e. front layer 3a described above upon which the air flow acts, thus creating an air flow that is highly laminar, which leads to all the advantages discussed above. Furthermore, the shape of air inlet 3 and, in particular, of lip 6 and of outer barrel 7 does not differ in any way from the ideal designed shape, thus overcoming possible structural limits present in air inlets according to the state of the art.

Figure 2:
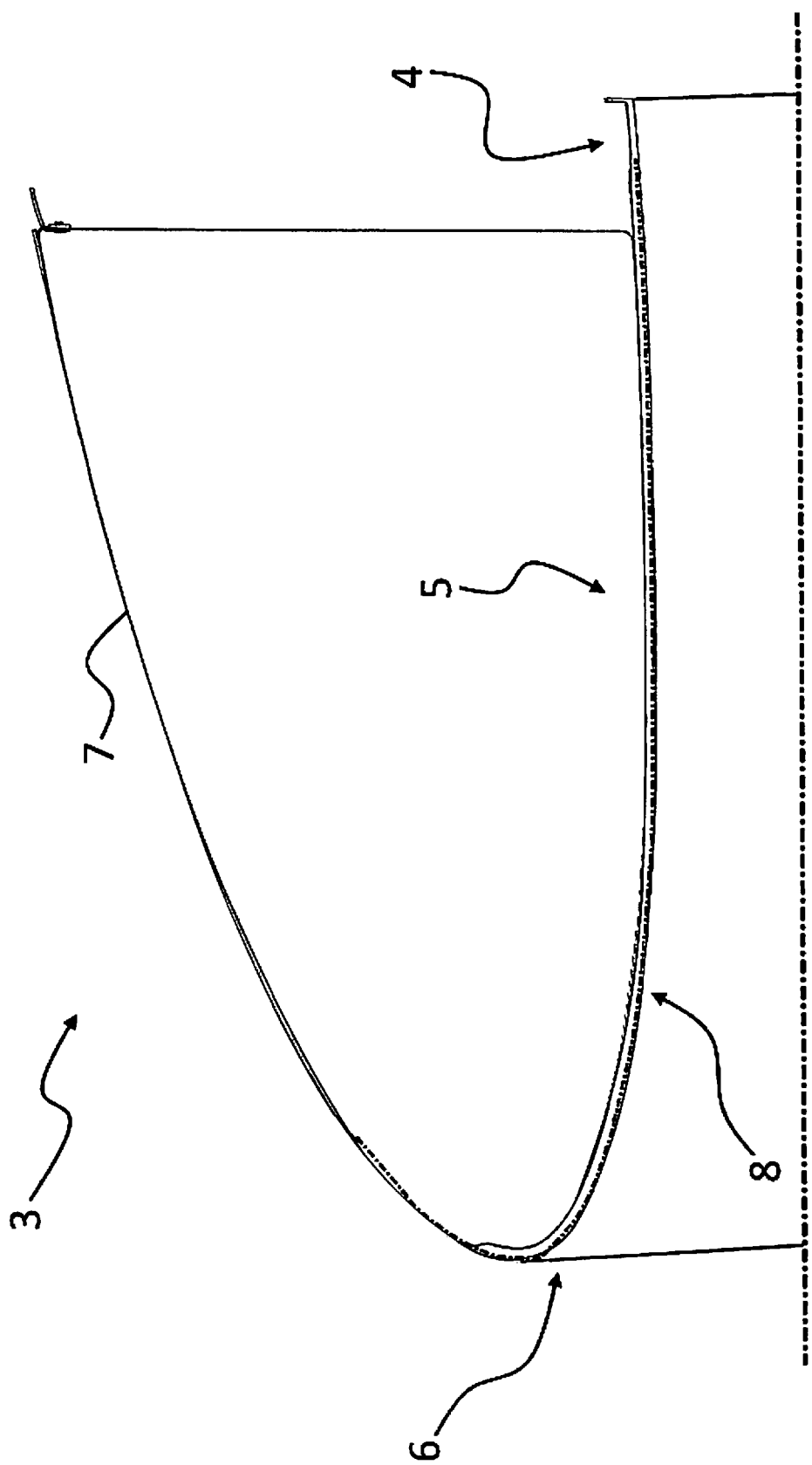
FIG. 2 shows the air inlet of FIG. 1 in an upper portion thereof.

FIG. 2 shows air inlet 3 of FIG. 1 in a cross section view in an upper portion thereof. The cross section shows that there are no structural discontinuities from engine ring 4 up to outer barrel 7, for air inlet 3 is manufactured as one single piece.

FIG. 2 further shows the extension of acoustic panel 5, which, in the explanatory and non-limiting embodiment shown therein, starts from engine ring 4 and reaches lip 6.

The figure further reveals how the anti-icing system can be incorporated in the structure of air inlet 3.

FIG. 2 also shows to a person skilled in the art that the profile of air inlet 3 can coincide with the theoretical designing profile, thus obtaining a laminar flow because there are no structural discontinuities that could create turbulences.

Furthermore, FIG. 2 reveals to a person skilled in the art where the closing plates or partitions could be placed, so that the inner structure of air inlet 3 is inaccessible, and where possible flanged portions could be arranged in order to fix air inlet 3 to containing structure 22 of a nacelle 2. Said closing plates or partitions and flanged portions can be fitted to air inlet 3 in a following phase, for example based on the features of nacelle 2 to which air inlet 3 is to be applied.

Figure 3:
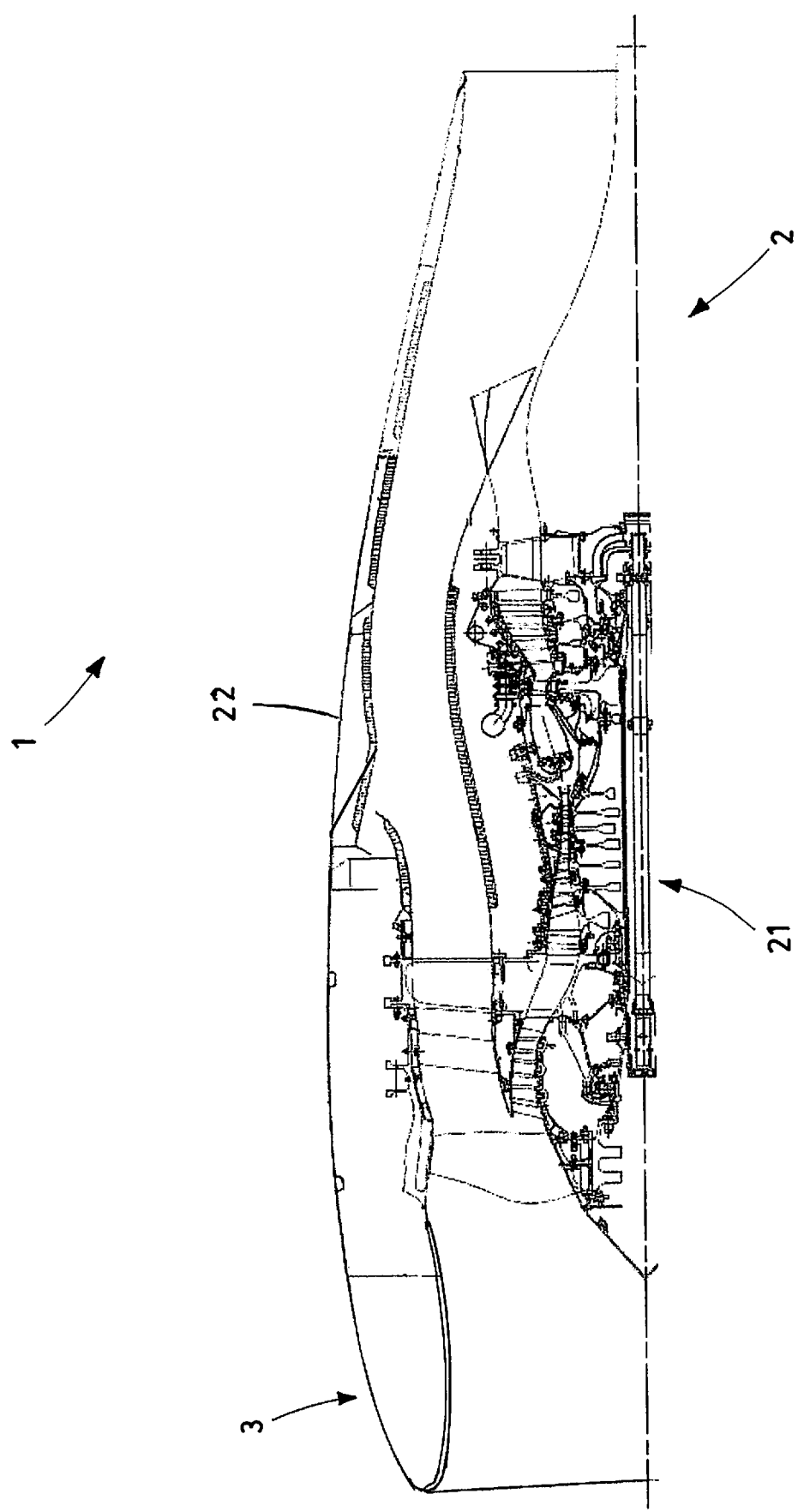
FIG. 3 shows, in a cross section view, the air inlet of an assembly with a nacelle in an upper portion.

FIG. 3 shows, in a cross section view, the air inlet 3 of an assembly with a nacelle 2 for an aircraft 1;

The air inlet 3 according to the invention can be applied to an already existing nacelle 2, thus improving the performances of engine 21.

Figure 4:
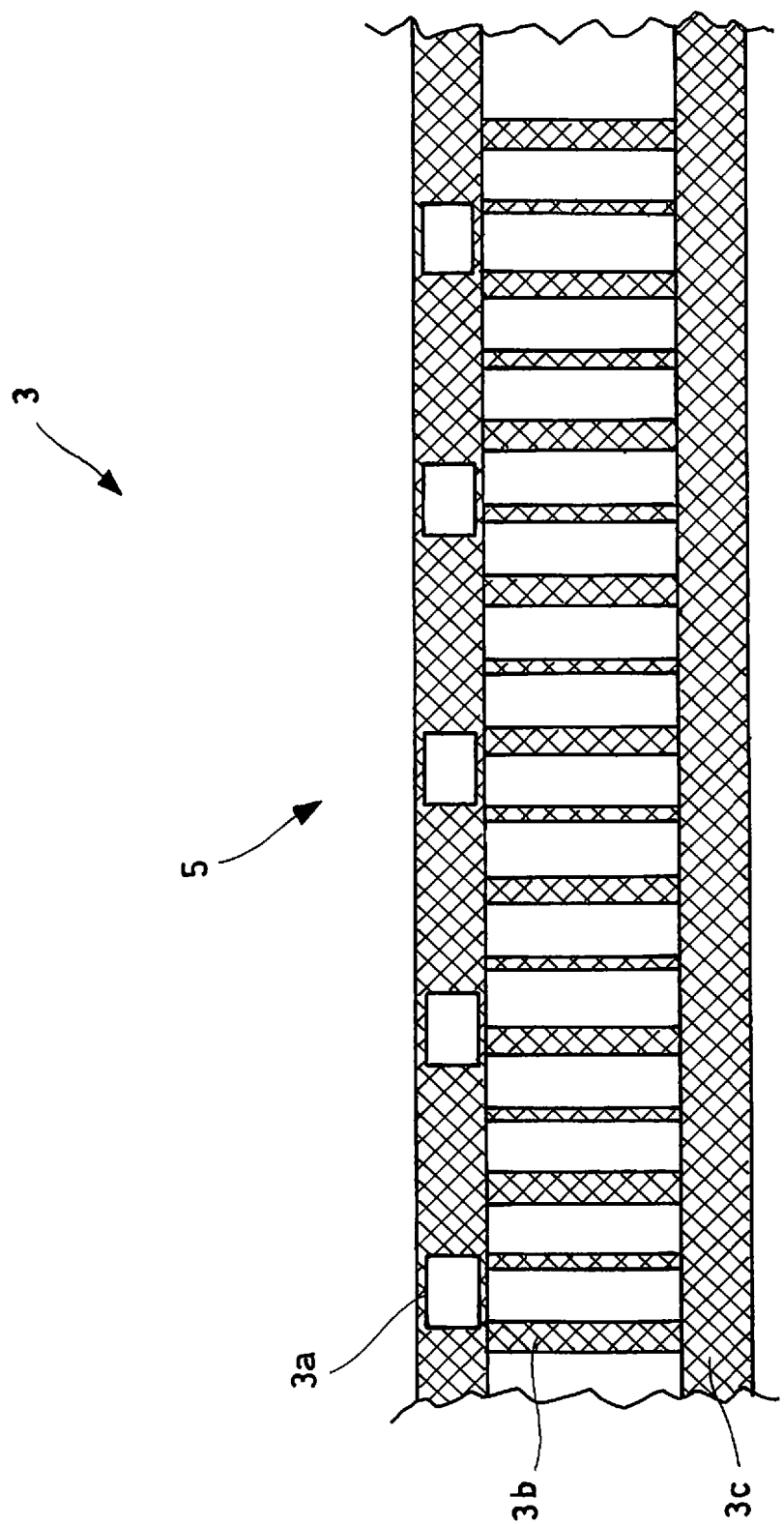
FIG. 4 shows, in an axonometric cross section view, a portion of the acoustic panel comprised in the air inlet according to the invention.

FIG. 4 shows, in a schematic cross-section view, a portion of a possible embodiment of acoustic panel 5 where front layer 3a, intermediate layer 3b and rear layer 3c are visible. The shape of the layers allows manufacturers to obtain a high-performance acoustic panel 5, which, for it is manufactured as one single piece with air inlet 3, in particular by means of the process described above, generates Helmholtz resonators, which lead to a noise lowering that is much greater than the ones that can be obtained with a combination of an acoustic panel assembled on an air inlet according to the state of the art.

The one-piece configuration of air inlet 3 according to the invention allows manufacturers to eliminate all joints, in particular between lip 6 and outer barrel 7, thus reducing the difference from the theoretical designing profile. This jointless profile ensures a laminar flow on the largest part possible of air inlet 3, thus offering improvements in terms of fuel consumptions of aircraft 1.

Hence, air inlet 3 according to the invention allows manufacturers to reduce energy consumption, both for the correct operation of air inlet 3 and for engine 21 of a nacelle 2 associated with air inlet 3.

Air inlet 3 according to the invention preferably is entirely made of a composite material and is manufactured with a co-curing process substantially carried out by means of one single stabilization cycle.

All the main components of air inlet 3, in particular acoustic panel 5, lip 6 and, if necessary, outer barrel 7 and engine ring 4, are made of a composite material, thus creating on single body obtained by means of one single stabilization cycle.

Therefore, this solution is especially advantageous for the manufacturing economy of production times and of the weight of air inlet 3.

Air inlet 3 according to the invention has a small weight compared to currently known air inlets, thanks to the elimination of the greatest part of the joints and of the connections organs, besides being capable of integrating, in the structure of air inlet 3 itself, elements that, according to the state of the art, were fixed to the structure of the air inlet.

Air inlet 3 according to the invention allows manufacturers to obtain an increase in the noise lowering capacity, for example as a consequence of the expansion of the acoustic area, i.e. the dimensions of panel 5, thanks to the perforation of the inner edge of lip 6, i.e. of front layer 3a, which is made of a composite material. Indeed, air inlet 3 according to the invention allows the surface adapted to lowering the noise to be increased, up to an increase thereof amounting to more than 70% compared to an air inlet consisting of discrete elements assembled together.

This solution allows manufacturers to integrate, in air inlet 3, including it in the latter, an anti-icing system 8, which is more efficient from the point of view of energy consumption as well as performances and manufacturing costs.

This solution, for its ensures laminar flows acting both on lip 6 and on outer barrel 7, leads to a reduction of the fuel consumption of aircraft 1, thanks to improved airfoils and through the elimination of joints.

Naturally, the principle of the invention being set forth, embodiments and implementation details can be widely changed relative to what described above and shown in the drawings as a mere way of non-limiting example, without in this way going beyond the scope of protection provided by the accompanying claims.

NUMERICAL REFERENCES

Aircraft 1
Nacelle 2
Engine 21
Containing structure 22
Air inlet 3
Front layer 3a
Intermediate layer 3b
Rear layer 3c
Engine ring 4
Acoustic panel 5
Lip 6
Outer barrel 7
Anti-icing system 8

The invention claimed is:

1. An air inlet for a nacelle for an aircraft comprising:
at least one acoustic panel comprising Helmholtz resonators, adapted to lower noise generated by an engine to which the air inlet is connected;
at least one lip, defining a profile upon which an air flow flowing into the air inlet acts;
said at least one acoustic panel and said at least one lip of the air inlet comprise one single piece, in one single body, made of a composite material;
an engine ring, adapted to connect the air inlet to an engine of the nacelle;
said at least one acoustic panel extends from the engine ring to said at least one lip;
said at least one acoustic panel, said at least one lip and said at least one engine ring of the air inlet are formed of one single piece consisting of one single body free of discontinuities and made of composite material;
wherein a single-cycle consolidated inner duct of the air inlet is jointless.

2. Air inlet according to claim 1, comprising an outer barrel, adapted to define the outer shape of the air inlet upon which an air flow acts;
said at least one acoustic panel, said at least one lip and said at least one engine ring and said at least one outer barrel of the air inlet comprise one single piece, in one single body, made of a composite material.

3. Air inlet according to claim 1, wherein an anti-icing system is incorporated in the structure of the air inlet.

4. Air inlet according to claim 3, wherein said anti-icing system comprises a redundant electronic circuit.

5. Air inlet according to claim 1, wherein said air inlet comprises a front layer, which defines an outer profile of the air inlet and is visible from the outside; a rear layer, which defines an inner profile of the air inlet and is not visible from the outside; and at least one intermediate layer, which is incorporated between said two layers and by which comprised in said acoustic panel.

6. A nacelle for an aircraft comprising an engine and a containing structure configured to surround said engine, which comprises an air inlet according to claim 1.

7. A method for manufacturing an air inlet, the air inlet comprising at least one acoustic panel, adapted to lower noise generated by an engine to which the air inlet is connected, at least one lip, defining a profile upon which an air flow flowing into the air inlet acts, and at least one engine ring, adapted to connect the air inlet to an engine of the nacelle, the air inlet being adapted to be applied to the nacelle, the method comprising, in sequence, the following steps:
laminating a front layer of the air inlet and forming a shape of the lip and the engine ring as a unitary body free of discontinuities;
assembling at least one honeycomb intermediate layer on at least one portion of said front layer from the engine ring to said at least one lip;
laminating a rear layer of the air inlet free of discontinuities;
processing the air inlet in one single consolidation cycle;
making a plurality of holes in at least one portion of the front layer, to generate in the unitary body the acoustic panel comprising Helmholtz resonators.

8. Method according to claim 7, further comprising, during the laminating a front layer, defining an outer barrel shape.

9. Method according to claim 7, wherein, during the assembling at least one honeycomb intermediate layer, extent and arrangement of the acoustic panel are defined.

10. An air inlet for a nacelle for an aircraft comprising:
at least one acoustic panel comprising Helmholtz resonators, adapted to lower noise generated by an engine to which the air inlet is connected;
at least one lip, defining a profile upon which an air flow flowing into the air inlet acts;
an engine ring, adapted to connect the air inlet to an engine of the nacelle;
an electric anti-icing system;
said at least one acoustic panel extends from said engine ring to said at least one lip;
said at least one acoustic panel, said at least one lip and said at least one engine ring of the air inlet are formed of one single piece consisting of one single body free of discontinuities and made of composite material; wherein a single consolidation cycle inner duct of the air inlet is jointless;
said electric anti-icing system being incorporated in the structure of the acoustic panel and the lip and comprising a solid state redundant electronic circuit comprising a plurality of connections or branches and redundant nodes.

11. An air inlet for a nacelle for an aircraft comprising:
at least one acoustic panel comprising Helmholtz resonators, adapted to lower noise generated by an engine to which the air inlet is connected;
at least one lip, defining a profile upon which an air flow flowing into the air inlet acts;
an engine ring, adapted to connect the air inlet to an engine of the nacelle;
an outer barrel, adapted to define an outer shape of the air inlet upon which an air flow acts;
said at least one acoustic panel, said at least one lip, said at least one engine ring and said outer barrel of the air inlet are formed of one single consolidation cycle piece consisting of one single body free of discontinuities and made of composite material; wherein:
an inner duct of the air inlet is jointless;
an outer profile of the inlet is jointless.

* * * * *